Patented Dec. 10, 1935

2,023,551

UNITED STATES PATENT OFFICE 2,023,551

GUAIACOL COMPOUNDS AND THE PRODUCTION THEREOF

Salo Rosenzweig, Vienna, Austria

No Drawing. Application October 11, 1934, Serial No. 747,985. In Austria June 28, 1933

15 Claims. (Cl. 260—99.20)

This invention relates to guaiacol compounds of a new type and methods of producing the same from polybasic phosphoric acids or their derivatives (such as acid chlorides, amides, and mixed esters) which are wholly or partly esterified with guaiacol, and in which the place of one or more of the acid hydrogen atoms is taken by basic components, saline compounds of phosphoric acid esterified with at least one guaiacol molecule being thereby produced. Compounds of guaiacol in which the basic component is formed of inorganic bases, such as for example alkalies, are known.

In accordance with the invention, new and valuable compounds of the above described type are produced when, as the basic component, organic bases, and that preferably in the form of free bases, or else as obtained by the double decomposition of their salts or by the appropriate application of other compounds or mixtures which yield such basic component, are caused to act upon the acid component.

As examples of substances which have proved to be particularly well suited for use as the basic component in the present method there may be mentioned, for example, aliphatic bases, and from among these oxyalkyl-amines or di- or poly-basic aliphatic amines, as also purine derivatives, and heterocyclic bases. From among these substances those are often of particular importance which in themselves have useful pharmacological properties or which impart to the products obtained in accordance with the invention other advantageous properties, such as for example ready solubility, capacity for resorption by the human organism, and the like. By the action of an excess or of a multiple molar quantity of the basic opponent upon the acid component, there can be obtained in many cases molecular compounds of the new salts with a free base. Likewise, other compounds, for example other salts, become linked to the salts produced in accordance with the invention, as molecular compounds. These molecular compounds show similar pharmacological properties as the above mentioned compounds. As acid component there is preferably employed the mono- or diguaiacol-phosphoric acid $(CH_3OC_6H_4)PO(OH)_2$ or $(CH_3OC_6H_4)_2POOH$, or their derivatives or mixtures thereof.

It has transpired that the salts produced in accordance with the invention, the basic components of which possess in themselves undesirable properties, for example bitter taste, lose these properties altogether or possess the same in but very much reduced extent. For example, the quinine salts of the acid guaiacol phosphoric acid esters are far less bitter to the taste in spite of adequate solubility than the quinine bases or the usual quinine salts. The capacity of the products according to the invention for resorption by the human organism is very favorable. It becomes possible, through the provision of the new salts, not only to make fuller use of the desirable properties of guaiacol but also to obtain products which possess the physiologically valuable properties of the basic components and/or exhibit new physiological effects. It has been found by the inventor that with the application (for example by administration per os) of the products obtained in accordance with the invention the guaiacol constituents or their compounds pass in more abundant quantities than with other known preparations, into various organs such as the lungs and the liver, and actually exercise an enhanced therapeutic effect (for example in the case of tuberculous lesions). Checking and comparative tests with known guaiacol preparations show that the latter, when applied in the same manner, cannot subsequently be detected, for the most part, in an effective quantity in the organs (for example lungs and liver). It has not been possible hitherto to utilize sufficiently nor to obtain the full benefit of the valuable properties of free guaiacol, since, when it is used in higher concentration appropriate for efficacy, it exerts a corrosive action upon the mucous membrane.

As compared with the known products, the compounds produced in accordance with the present invention are capable of more perfect resorption and distribution in the human organism.

Examples (1) 1 mol. (153.4 grams) of phosphoroxychloride ($POCl_3$) is caused to act upon 2 mols. (248.2 grams) of guaiacol in the cold, in the presence of pyridine and benzol as solvent. In this manner there is first produced a pyridine compound of the guaiacol phosphoric acid ester. From the initially clear reaction solution there separates out after a certain time pyridine hydrochloride which is then filtered off. The benzol is then distilled off, and to the residual acid chloride there is added alcoholic alkaline lye in a molar proportion (containing 40.1 grams of NaOH). After filtering off of the alkali chloride, which is hardly soluble in alcohol, there is obtained, by evaporation of the filtrate, the alkali salt of the acid guaiacol phosphoric acid ester, $(CH_3OC_6H_5O)_2PO.ONa$.

3.2 grams of Na salt of the said guaiacol phosphoric acid ester is dissolved in approximately 150 cc. of water. To this solution there is added a solution of 4 grams of quinine hydrochloride likewise dissolved in approximately 150 cc. of water. After a short time abundant quantities of the quinine salt of the guaiacol phosphoric acid ester separate out, which, when filtered and washed with a slight quantity of water, represents a white pulverulent crystalline mass. The quinine salt is adequately soluble in water, and has but slight taste.

(2) 2 mols. of diguaiacol phosphoric acid (620.4 grams) and 1 mol. of ethylene-diamine (60.1 grams) are mixed together with the addition of a slight excess of ethylene-diamine (approximately 2-3%), and then evaporated with moderate heating, in a water bath. The honey-like residue crystallizes after prolonged cooling with ice. A yellowish crystalline mass separates out, which is then expressed between sheets of filter paper, and recrystallized out of a slight quantity of alcohol. In this manner a white crystalline product is obtained which is readily soluble in water. The methoxyl test gives the following results:

$OCH_3$ ascertained: 17.9%
$OCH_3$ calculated for $C_{30}H_{38}O_{12}N_2P_2$: 18.2%
Melting point: 135° C.

(3) 1 mol. each of diguaiacyl phosphoric acid (310.2 grams) and triethanol-amine (117.2 grams) are mixed together and evaporated in a dish over a water bath. The resulting reaction product is filtered on a suction strainer, and then twice recrystallized out of alcohol. The compound obtained in a colourless mass which crystallizes well, is readily soluble in water, of pleasant taste, and extremely easily reabsorbed by the organism.

Melting point: 100° C.

What I claim is:

1. A salt consisting of a polybasic phosphoric acid partly esterified with guaiacol, and an organic basic constituent.

2. A salt consisting of diguaiacol phosphoric acid and an organic basic constituent.

3. A salt consisting of monoguaiacol phosphoric acid and an organic basic constituent.

4. A salt consisting of a polybasic phosphoric acid partly esterified with guaiacol, and an aliphatic amine as the basic constituent.

5. A salt consisting of a polybasic phosphoric acid partly esterified with guaiacol, and an oxyalkyl-amine as the basic constituent.

6. A salt consisting of a polybasic phosphoric acid partly esterified with guaiacol, and a triethanol-amine as the basic constituent.

7. A salt consisting of a polybasic phosphoric acid partly esterified with guaiacol, and a multivalent aliphatic amine as the basic constituent.

8. A salt consisting of a polybasic phosphoric acid partly esterified with guaiacol, and an ethylene-diamine as the basic constituent.

9. A salt consisting of a polybasic phosphoric acid partly esterified with guaiacol, and a heterocyclic base as the basic constituent.

10. A salt consisting of a polybasic phosphoric acid partly esterified with guaiacol, and quinine as the basic constituent.

11. In a method of manufacturing guaiacol compounds, of the type in which orthophosphoric acid partly esterified with guaiacol is converted, by the place of at least one acid hydrogen atom being taken by a basic component, into a saline compound having at least one guaiacol molecule of esterified phosphoric acid, the step of employing an organic base as the basic constituent, to yield a salt.

12. In a method of manufacturing guaiacol compounds, of the type in which a derivative of orthophosphoric acid capable of being converted by bases into salts, and partly esterified with guaiacol, is converted, by the place of at least one acid hydrogen atom being taken by a basic component, into a saline compound having at least one guaiacol molecule of esterified phosphoric acid, the step of employing an organic base as the basic constituent, to yield a salt.

13. In a method of manufacturing guaiacol compounds, of the type in which orthophosphoric acid partly esterified with guaiacol is converted, by the place of at least one acid hydrogen atom being taken by a basic component, into a saline compound having at least one guaiacol molecule of esterified phosphoric acid, the steps of causing an inorganic salt of the said esterified phosphoric acid to react by double decomposition with a salt of an organic base, and separating out the resulting salt containing guaiacol.

14. In a method of manufacturing guaiacol compounds, of the type in which a derivative of orthophosphoric acid capable of being converted by bases into salts, and partly esterified with guaiacol, is converted, by the place of at least one acid hydrogen atom being taken by a basic component, into a saline compound having at least one guaiacol molecule of esterified phosphoric acid, the steps of causing the said derivative to react by double decomposition with a salt of an organic base, and separating out the resulting salt containing guaiacol.

15. The method of preparing diguaiacyl phosphoric acid salts which consists in causing a solution of free diguaiacyl phosphoric acid to react with an equimolecular quantity of an organic base.

SALO ROSENZWEIG.